(12) United States Patent
Armstrong et al.

(10) Patent No.: US 8,064,487 B1
(45) Date of Patent: Nov. 22, 2011

(54) VIRTUAL OFFICE PRESENCE BRIDGE

(75) Inventors: James Lee Armstrong, Arvada, CO (US); Robert D. Burnham, Idaho Springs, CO (US); Cliff L. Howard, Dacono, CO (US); Susan K. Love, Broomfield, CO (US); Paul Michael Madsen, Denver, CO (US); John Vincent Rishea, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 901 days.

(21) Appl. No.: 11/406,054

(22) Filed: Apr. 17, 2006

(51) Int. Cl.
*H04J 99/00* (2009.01)
*H04L 12/28* (2006.01)
*H04M 3/42* (2006.01)

(52) U.S. Cl. .................. 370/546; 370/259; 379/201.01

(58) Field of Classification Search .................. 370/486, 370/464, 480, 485
See application file for complete search history.

(56) References Cited

U.S. PATENT DOCUMENTS

| | | | |
|---|---|---|---|
| 4,598,275 A * | 7/1986 | Ross et al. | 340/573.4 |
| 5,764,639 A * | 6/1998 | Staples et al. | 370/401 |
| 5,867,494 A * | 2/1999 | Krishnaswamy et al. | 370/352 |
| 5,889,845 A * | 3/1999 | Staples et al. | 379/211.02 |
| 6,658,095 B1 * | 12/2003 | Yoakum et al. | 379/93.01 |
| 6,820,055 B2 * | 11/2004 | Saindon et al. | 704/235 |
| 6,864,779 B2 * | 3/2005 | Stack et al. | 340/3.5 |
| 7,035,804 B2 * | 4/2006 | Saindon et al. | 704/271 |
| 7,106,358 B2 * | 9/2006 | Valliath et al. | 348/14.08 |
| 7,433,922 B2 * | 10/2008 | Engstrom | 709/205 |
| 2002/0161578 A1 * | 10/2002 | Saindon et al. | 704/235 |
| 2002/0161579 A1 * | 10/2002 | Saindon et al. | 704/235 |
| 2003/0004743 A1 * | 1/2003 | Callegari | 705/1 |
| 2003/0167176 A1 * | 9/2003 | Knudson et al. | 705/1 |
| 2004/0062383 A1 * | 4/2004 | Sylvain | 379/265.06 |
| 2004/0088356 A1 * | 5/2004 | Sellen et al. | 709/205 |
| 2004/0183749 A1 * | 9/2004 | Vertegaal | 345/7 |
| 2004/0189701 A1 * | 9/2004 | Badt, Jr. | 345/753 |
| 2004/0203644 A1 * | 10/2004 | Anders et al. | 455/414.1 |
| 2005/0034079 A1 * | 2/2005 | Gunasekar et al. | 715/753 |

(Continued)

FOREIGN PATENT DOCUMENTS

WO WO-0043941 7/2000

OTHER PUBLICATIONS

Seidler, "RFID Opportunities for mobile telecommunication services", ITU-T Lighthouse Technical Paper, May 2005, available at http://www.itu.int/ITU-T/techwatch/docs/rfid.pdf, accessed on Sep. 18, 2009, pp. 1-21.

(Continued)

*Primary Examiner* — Kevin C Harper
(74) *Attorney, Agent, or Firm* — Sheridan Ross P.C.

(57) ABSTRACT

Systems and methods for providing a communication bridge between a physical location and a virtual location are provided. In particular, the presence of a visitor to a physical location is detected, and notification of the presence of a visitor is provided to a user associated with the physical location. The notification may include an identification of the visitor. Following notification, real-time communications between the visitor at the first physical location and the user at the virtual location are established, without requiring entry of a communication address for the virtual office of the user by the visitor.

19 Claims, 4 Drawing Sheets

U.S. PATENT DOCUMENTS

2005/0071768 A1* 3/2005 Araki et al. .................. 715/757
2005/0088320 A1   4/2005 Kovach
2005/0163104 A1* 7/2005 Christensen et al. ......... 370/352
2005/0267605 A1* 12/2005 Lee et al. ....................... 700/19
2005/0285934 A1* 12/2005 Carter ....................... 348/14.06
2006/0093998 A1* 5/2006 Vertegaal ..................... 434/236
2007/0120965 A1* 5/2007 Sandberg et al. .......... 348/14.08

OTHER PUBLICATIONS

"Microsoft Office Groove", Microsoft office Groove webpage, as early as, available at http://www.groove.net/home/index.cfm, accessed on Sep. 18, 2009, p. 1.

Background of the above captioned application (previously disclosed).

* cited by examiner

VIRTUAL OFFICE PRESENCE BRIDGE

FIELD OF THE INVENTION

The disclosed invention is related to establishing communications between a visitor to a location associated with a user and the actual location of that user.

BACKGROUND

Advances in telecommunications and computer networks have made it easier for persons to work from virtual offices. As working from virtual offices has become more common, communications between co-workers within a traditional office setting has suffered. For instance, whereas co-workers could often reasonably expect other co-workers to be present within their office during normal working hours, this is no longer the case.

When an employee of an enterprise is working from a virtual office (e.g. from home), that person is necessarily absent from their regular office. Because of this, the person is unavailable for immediate conversation with others in the office. This situation can result in inconvenience and wasted time for others in the work place. For example, when a co-worker goes to the office in the work place of someone working from a virtual office, they will find the office empty. As a result, the interaction that would have occurred must be delayed until the person being sought is actually in their office. Alternatively, the co-worker must contact the person being sought through a communication channel, such as via telephone or email. Establishing contact through a communication channel can be inconvenient, because it often requires the co-worker to look-up the virtual office contact information for the person being sought, and manually enter that information in a communication device.

In order to facilitate contact through a communication channel, a person working from their virtual office may leave contact information at their office in the workplace. However, such contact information may not be immediately apparent to someone seeking to converse with the person working out of a virtual office. In addition, the person dropping by the office usually must remember the contact information or write it down and then return to their own office in order to establish communication with the person at the virtual office. Another difficulty with a system that relies on leaving contact information at the office in the workplace is that the person working from a virtual office can forget to leave contact information. In addition, a person working from a virtual office may not have known that they would be working from that office beforehand and therefore may have had no opportunity to leave contact information. In addition, even where contact information is available, a person working from a virtual office has been unable to provide certificates authorizing actions to others in the work place.

SUMMARY

Embodiments of the present invention are directed to solving these and other problems and disadvantages of the prior art. In accordance with embodiments of the present inventions, the physical to virtual office gap is bridged by providing for the automated establishment of communications between a first person or user working from a virtual office and a second person or visitor at the location of the first person's physical office or other area associated with the first person. More particularly, the presence of the second person at the area associated with the first person is detected, and the first person is notified of the second person's presence at that location. A communication channel between the first and second persons may then be established, without requiring additional input or action by the second person. The first and second persons may then converse or otherwise communicate using the communication channel.

In accordance with embodiments of the present invention, notification of the presence of the second person may include notification of the identity of the second person. In accordance with still other embodiments of the present invention, the establishment of a communication channel between the first and second persons may only be initiated after the first person has provided an input approving such communication. In accordance with still other embodiments of the present invention, communications between the first and second persons may be established through a desk telephone or other communication device associated with the first person's physical office.

In accordance with embodiments of the present invention, the second person may be invited to communicate with the first person via a voice message delivered through a communication device at the location associated with the first person. For example, a voice message may be delivered by a telephone. Alternatively or in addition, a special ring may be generated to indicate to the second person that the first person is available for real-time communication.

The detection of the presence of the person at the physical office may be made by a physical presence detector. In accordance with embodiments of the present invention, the physical presence detector may comprise a radio frequency identification (RFID) reader that obtains presence and identification information associated with the second person from an RFID tag carried by the second person. In order to deliver information indicating that a person is present at a physical location, a database may be queried to determine how the first person at a virtual office location should be notified.

In accordance with still other embodiments of the present invention, a first person working from a virtual office may provide an authorization or information to a second person at the first person's physical office. Authorization may be provided in the form of a digital certificate that is delivered to the second person, or a certificate that is output to the second person.

Additional features and advantages of the present invention will become more readily apparent from the following discussion, particularly when taken together with the accompanying drawings.

DETAILED DESCRIPTION

Embodiments of the present invention are generally directed to bridging the gap between a virtual office and a physical office. More particularly, embodiments of the present invention detect the presence of a visitor to a fixed or physical location or office at a time when the person associated with the physical office is working from a virtual office, and providing an automated means for establishing real-time communication between the visitor to the physical office and the person at the virtual office.

Figure 1:
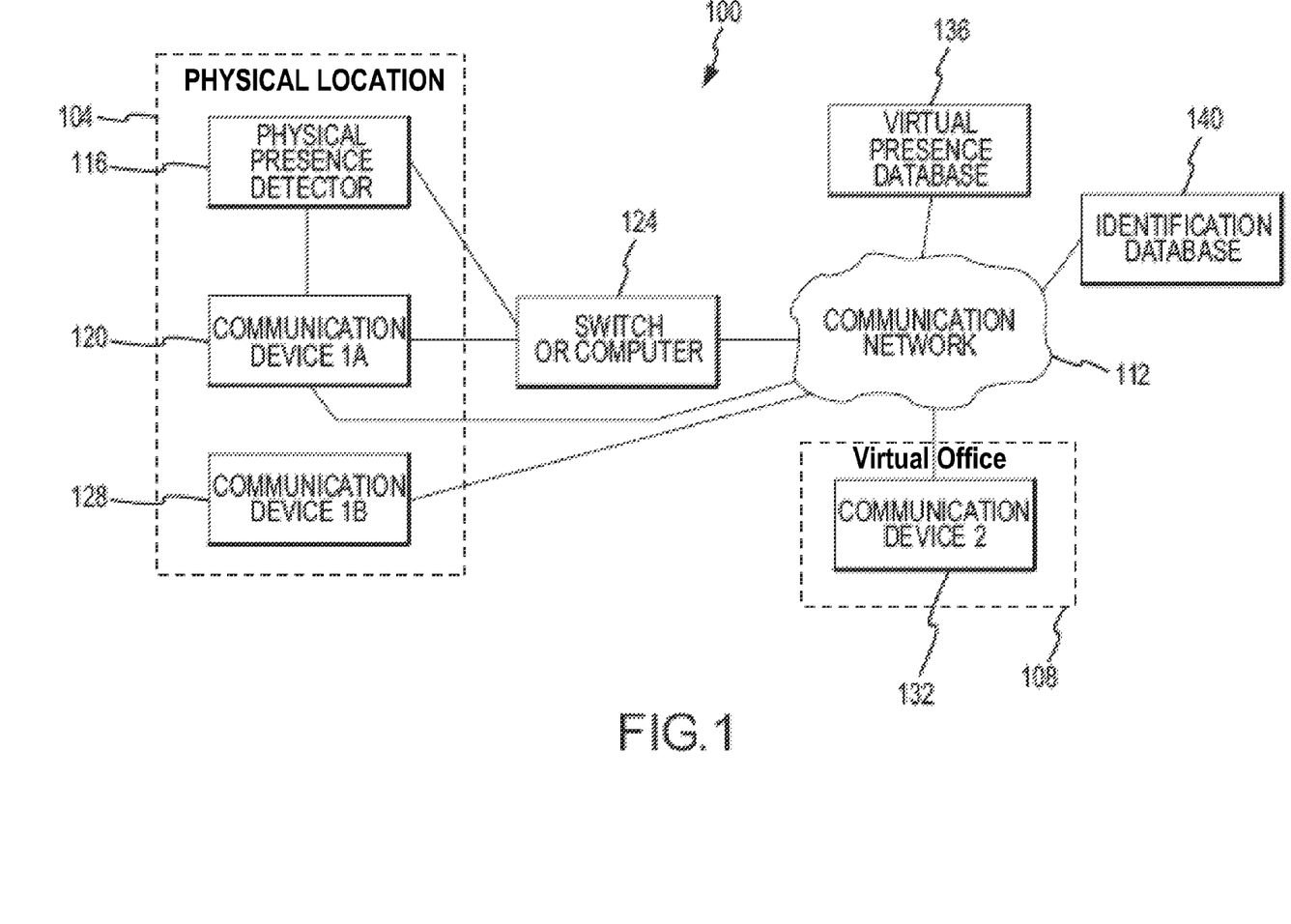
FIG. 1 is a block diagram of a communication system in accordance with embodiments of the present invention.

With reference to FIG. 1, a system 100 in accordance with embodiments of the present invention capable of bridging a gap between a physical office or other location 104 associated with a first person and a virtual office 108 from which the first person is actually working, is illustrated. In general, the physical location associated with a first person 104 is interconnected to the first person's virtual office 108 through a communication network or channel 112.

The physical location 104 associated with the first person generally includes a physical presence detector 116 and a first communication device 120. In accordance with embodiments of the present invention, the physical presence detector 116 and/or the communication device 120 are interconnected to the communication network 112 through a switch or computer 124. The first physical location 104 may also be associated with a second communication device 128.

The virtual office 108 generally includes a communication device 132. The communication device 132 may be interconnected to the communication network 112 directly. Alternatively or in addition, the communication device 132 associated with the virtual office 108 may be interconnected to the communication network 112 through a switch or computer.

The system 100 may additionally include databases for storing various information used by other components of the system. For example, a virtual presence database 136 may be provided for maintaining contact information relating physical locations associated with users with current contact information (i.e. virtual office information) for the users. Another example of a database that may be associated with a system 100 is an identification database 140 for associating an identifier detected by a physical presence detector 116 with the identity of a visitor to the physical location 104.

The communication network 112 may comprise one or more networks of various types and in various combinations. For example, a communication network 112 may comprise the public switched telephony network (PSTN). Other examples of a communication network 112 include a wireline or wireless Internet protocol network, such as an Ethernet network, or a cellular telephone network.

The physical presence detector 116 generally functions as a means for detecting the presence of a person at a physical location 104. Accordingly, examples of a physical presence detector 116 include a motion detector, a magnetic card reader, and a radio frequency identification detector (RFID) reader. Accordingly, it can be appreciated that, in the case of a motion detector or other detector that simply determines the presence of a person, information identifying the person at the first physical location is not obtained. As can also be appreciated by one of skill in the art after consideration of the present disclosure, in addition to the physical presence of a person, information identifying the person who is present may be provided to a magnetic card reader by having the person swipe a magnetic card providing identifying information. Similarly, information identifying a person present at the first location may be obtained by an RFID reader that reads an RFID tag carried by the person present at the first location that the person waives in front of the reader or that is otherwise detected by the reader.

A communication device 120, 128 and/or 132 may comprise a telephone (either wire line or wireless), computer, personal digital assistant or a combination of such devices. Furthermore, a communication device 120, 128 or 132 may provide communications using one or more communications channels of various types. For example, a communication device 120, 128 or 132 may comprise a telephone communicating over the public switched telephony network, a telephone or soft telephone communicating over an Internet protocol network, a computer providing text messaging, etc. In general, a communication device 120, 128 and/or 132 provides a means for communication that can be used to establish a communication channel between the person associated with the first physical location 104 that is at a virtual office location 108, and the person visiting the first physical location 104. In addition, a communication device 120, 128 and/or 132 can comprise a means for notifying the person visiting the first physical location that the person associated with the first physical location 104 is available for real time communication.

The second communication device 128, if provided, can provide an alternative or additional communication means. For example, information identifying the visitor to the first physical location 104 obtained by the physical presence detector 116 may be transmitted to the communication device 132 at the virtual office location 108 via the first communication device 120 while communications between the visitor to the first physical location and the person at the virtual office 108 may be established between the communication device 132 at the virtual office location 108 and the second communication device 128 at the first physical location 104.

A switch or computer 124 may comprise a telephony system switch, such as a private branch exchange (PBX), local exchange carrier switch, or other telephony system server or switch. Other examples of a switch or computer include an Internet protocol network switch or gateway or an Internet protocol network application server.

Figure 2:
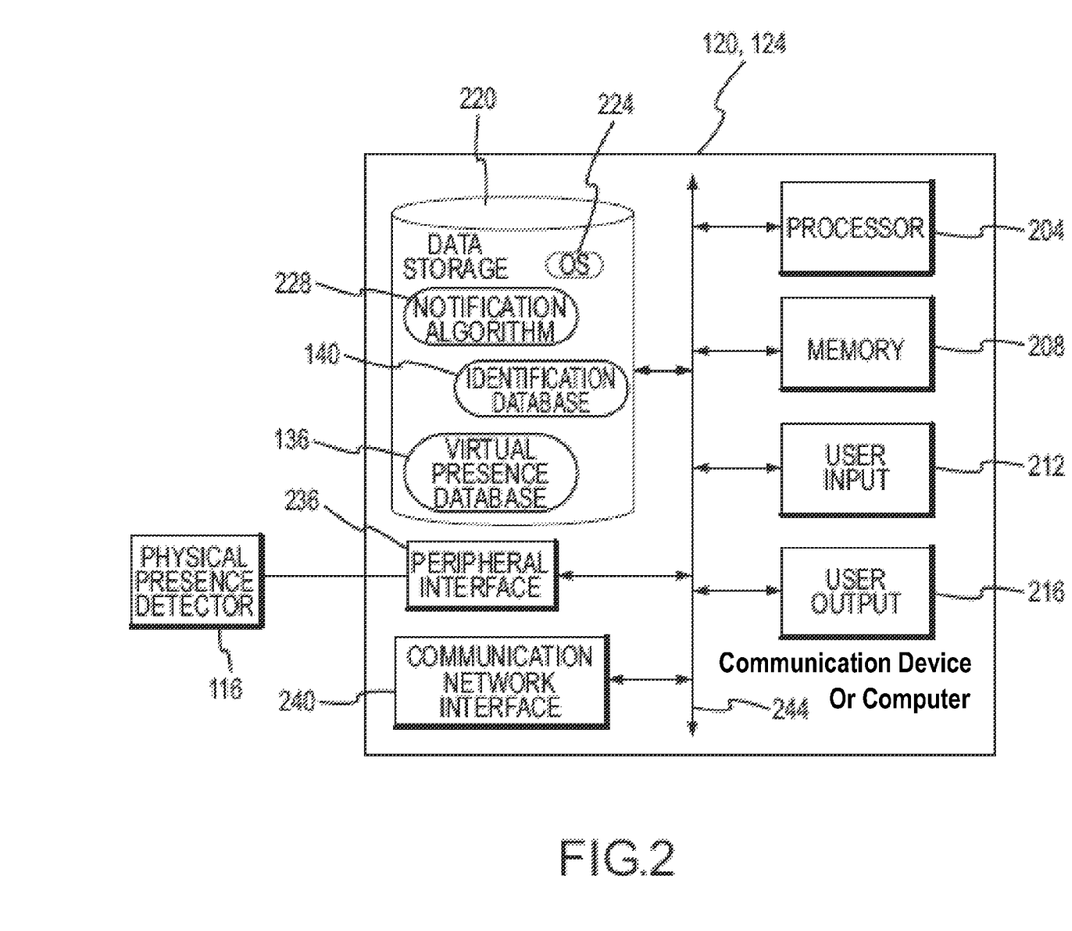
FIG. 2 is a block diagram depicting components of a communication device or a computer in accordance with embodiments of the present invention.

FIG. 2 is a block diagram depicting a communication device 120, 128 or 132 and/or a switch or computer 124 in accordance with embodiments of the present invention. The components may include a processor 204 capable of executing program instructions. Accordingly, the processor 204 may include any general purpose programmable processor or controller for executing application programming. Alternatively, the processor may comprise a specially configured application specific integrated circuit (ASIC). The processor 204 generally functions to run programming code implementing various functions performed by the communication device 120, 128 or 132 or the switch or computer 124. For example, in the case of a communication device 120, 128 or 132 such functions may include telephony, facsimile, instant messaging or other communication functions. In the case of a switch or computer 124, such functions may include the processing, delivery, and storage of email, voice mail, facsimile or instant messaging messages, and the establishment of communication channels in support of real-time communications.

A communication device 120, 128 or 132 or a switch or computer 124 may additionally include memory 208 for use in connection with the execution of programming by the processor 204, and for the temporary or long term storage of data or program instructions. For example, the memory 208 may be used in connection with the operation of a notification algorithm that establishes real time communications between a visitor to a physical location associated with a first person and the first person while the first person is working from a virtual office. The memory 208 may comprise solid state memory resident, removable or remote in nature, such as DRAM and SDRAM. Where the processor 204 comprises a controller, the memory 208 may be integral to the processor 204.

In addition, various user input devices 212 and user output devices 216 may be provided. Examples of input devices 212 include a microphone, keyboard, numeric keypad, scanner and pointing device combined with a screen or other position encoder. Examples of user output devices 216 include a speaker, alpha numeric display, ringer, printer port, compact flash or other removable memory port, and a printer.

A communication device, 120, 128 or 132 or a switch or computer 124 may also include data storage 220 for the storage of application programming and/or data, for example, operating system software 224 may be stored in the data storage 220. Examples of applications that may be stored in the data storage 220 include notification algorithm software 228 and various databases, such as a virtual presence database 136. The notification algorithm 228 generally provides the instructions that are executed in order to provide a bridge between a physical location and a virtual office location as described herein. A communication device 120, 128 or 132 may also have stored in data storage 220 communications applications such as telephony applications to provide voice communication or other telephony features. Furthermore, telephony features may be provided by providing a soft telephone. A switch or computer 124 may provide telephony switching or other communication support and/or routing applications. The virtual presence database 136 may comprise contact information to enable real-time communications between a visitor to a first physical location and a person associated with that first physical location who is working from a virtual office. As can also be appreciated by one of skill in the art after consideration of the present disclosure, the identification database 140 associates an identifier detected by a physical presence detector 116 at a first physical location 104 with the identity of the person carrying or providing an identifier. Accordingly, databases such as databases 136 and 140 may be incorporated into data storage 220 provided as part of a communication device 120 or a switch or computer 124. Alternatively, or in addition, the communication device 120 or a switch or computer 124 may provide an application interface to a virtual presence database 136 and/or identification database 140 stored on data storage that is separate from the communication device 120 or the switch or computer 124.

A communication device 120 or a switch or computer 124 in accordance with embodiments of the present invention may also include a peripheral interface 236. Examples of a peripheral interface 236 include a universal serial bus (USB), IEEE 1394 (Firewire), Ethernet, or any other port or interface operable to interconnect a peripheral device to the communication device 120, 128 or 132 or the switch or computer 124. A particular example of a peripheral device that may be interconnected using the peripheral interface 236 is a physical presence detector 116.

A communication device 120 or a switch or computer 124 may also include one or more communication network interfaces 240. An example of a communication network interface 240 includes a packet data network interface such as a wired or wireless Ethernet interface. Additional examples of a communication network interface 240 include a telephony interface, such as a PSTN, PBX, or other wireless or wireline interfaces. A communication device 120, 128 or 132 a switch or computer 124 may additionally include a communication bus 224 to allow communications between the various components of the device. The components 204, 208, 212, 216, 240, 236, and 220 may communicate over a communication bus 244.

Figure 3:
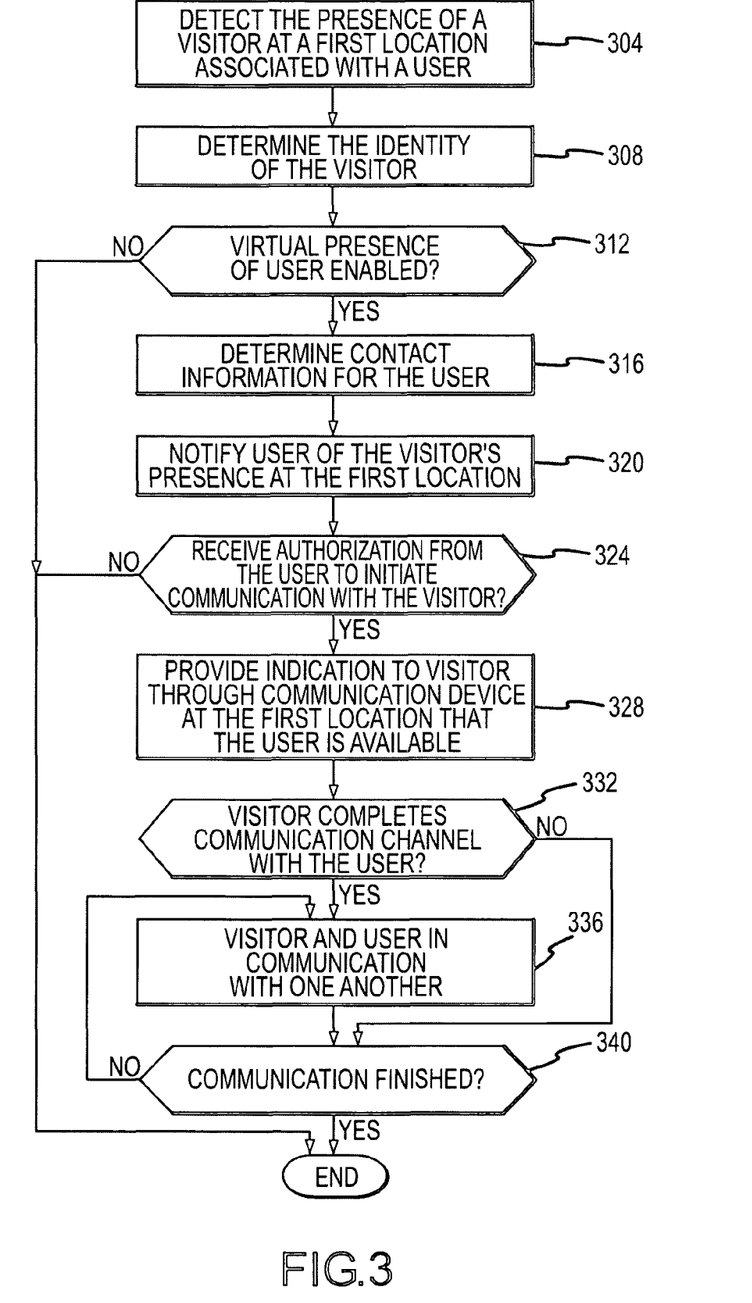
FIG. 3 is a flow chart depicting aspects of the operation of a system for providing a virtual office presence bridge in accordance with the embodiments of the present invention.

With reference now to FIG. 3, aspects of the operation of the system 100 for providing a communication bridge between a physical location and a virtual office location are illustrated. Initially, at step 304, the presence of a visitor at a first physical location 104 associated with the user (i.e. the person associated with the first physical location 104) is detected. The detection of a visitor at a first physical location 104 can comprise the detection of a visitor to an office or cubicle associated with a first person (i.e. the user) at a work place. Furthermore, the detection of a visitor may comprise the generation of a presence detection signal by a physical presence detector 116 at the first physical location 104. Accordingly, where a physical presence detector 116 comprises a motion detector, a signal from the physical presence detector 116 may comprise simply an indication that a person has arrived at the first physical location 104. Where the physical presence detector 116 additionally or alternatively comprises a magnetic card reader, RFID reader or other device capable of obtaining identifying information, the signal from the physical presence detector 116 may include identifying information in addition to the signal that simply indicates that the presence of a visitor.

The identity of the visitor may be determined at step 308. Determining the identity of the visitor may be performed automatically, for example in the case of a physical presence detector 116 such as a magnetic card reader or RFID reader that obtains identifying information from the visitor. As can be appreciated by one of skill in the art, determining the identity of the visitor may require that the visitor swipe a magnetic identification card through a magnetic card reader, or may require the visitor to wave an RFID tag in the vicinity of an RFID reader. In accordance with still other embodiments of the present invention, determining the identity of the visitor may comprise, in response to detecting the presence of the visitor, playing a recorded message or otherwise signaling to the visitor that the person associated with the first physical location 104 may be available for real-time communication. The signal may also request that the visitor provide identifying information, for example by presenting a card or tag as appropriate to the physical presence detector 116, or by otherwise providing identifying information, for example through a user input 212 associated with a communication device 120 or a switch or computer 124 at the first physical location 104.

At step 312, a determination is made as to whether the user has enabled any virtual presence feature. If the feature has not been enabled, the process may end. That is, where the virtual presence feature is not enabled, no real-time communication is established between the visitor and the user. If the virtual presence feature is enabled, contact information for the user is determined (step 316). As can be appreciated by one of skill in the art after consideration of the present disclosure, the determination of contact information for the user may comprise determining the address of a communication endpoint 132 associated with the virtual office 108 from which the user is working. As a particular example, if the user is working from their home, determining contact information for the user may comprise looking up the home telephone number for the user. As a further example, where the user is traveling, determining contact information for the user may comprise obtaining a mobile telephone number for the user. In accordance with still other embodiments of the present invention, determining contact information for the user may additionally or alternatively comprise obtaining an instant messaging, email, or other address for the user that can be used to provide information to the user in realtime at their virtual office location. Furthermore, the step of determining contact information for the user can be performed in various ways. For instance, the user may provide such information by entering an appropriate setting in notification algorithm application software 228. Contact information may also be obtained by querying a database 136 or another application, such as a calendar application.

The user is then notified of the visitor's presence at the first physical location 104 (step 320). This notification to the user may be in the form of a signal alerting the user that the visitor wishes to speak with the user. Furthermore, this notification may include an identification of the visitor. Notification may be delivered in various ways, for example through a text message displayed to the user by a device at the virtual office location 108, such as by a computer screen, a display screen of a telephone or other communication device 132 or a voiced alert provided by an audio output of a computer or other communication device 132.

At step 324, a determination is made as to whether authorization from the user to initiate communication with the visitor (i.e. to provide a communication bridge between the physical location associated with the user 104 and the virtual office location 108 at which the user can be contacted) has been received. Authorization from the user may be in the form of a user input provided through a user input device 212 included as part of a communication device 132 at the virtual office location 108. Authorization may also include determining that the user has previously authorized the establishment or attempt at establishing communications between any visitor and the user, or between specified visitors and the user. Accordingly, determining whether authorization has been received can comprise accessing a look-up table or database 132 to determine whether an attempt should be made to initiate communication with the visitor. If authorization is not received from the user, the process may end.

If authorization to initiate communication with the visitor has been received from the user, an indication is provided to the visitor through a communication device 120 at the first physical location 104 that the user is available for real-time communication (step 328). For example, such an indication may be provided through a special ring at a communication device 120 comprising a telephone, a voiced message delivered by a user output 216 comprising an audio output associated with a communication device 120 at the first physical location 104 or a combination of a special ring and a voiced message. An example of a voiced message may include an announcement such as: "The person you are attempting to contact is in his virtual office and is available to speak with you." Furthermore, this special ring and/or voiced announcement can be delivered through a special communication device 128 provided in addition to a communication device 120. The special communication device 128 may comprise a specially provided desk telephone or other communication device intended device for use by visitors to provide a bridge to the user's virtual office 108. The special communication device 128 may also comprise a communication device 128 carried by the visitor, such as a cellular telephone or a PDA, that the notification algorithm 228 identifies through information identifying the visitor.

At step 332, a determination is made as to whether the visitor has completed a communication channel with the user. Completion of the communication channel can comprise picking-up the receiver of a communication device 120 or 128, or otherwise indicating a desire to continue with the establishment of communications with the user. If the visitor completes the communication channel, the visitor and user are placed in communication with one another (step 336). Where the communication channel comprises a voice telephony channel, the user and the visitor may speak to one another in real-time. After placing the visitor and the user in communication with one another at step 336, or after determining that the visitor has not completed a communication channel at step 332, a determination may be made as to whether the communication is finished (step 340). For example, the visitor or the user may place the handset of the telephone being used for the communication with the other party on hook. As a further example, for instance where the visitor has not completed a communication channel with the user, a determination that the communication is finished may be made by a determination that the visitor is no long present at the first physical location 104. If the communication is not finished, the communication channel may be maintained (i.e. the process may return to step 336). If the communication is finished, the process may end.

As can be appreciated by one of skill in the art after consideration of the present disclosure, embodiments of the present invention provide for real-time communications between a visitor and a user associated with a physical location when the user is not actually present at that first physical location 104, and is instead working from a virtual office 108. Furthermore, embodiments of the present invention provide for the automated establishment of a communication channel, thereby avoiding a need for the visitor to manually obtain and/or enter contact information for the user, and/or manually initiate communications with the user.

Figure 4:
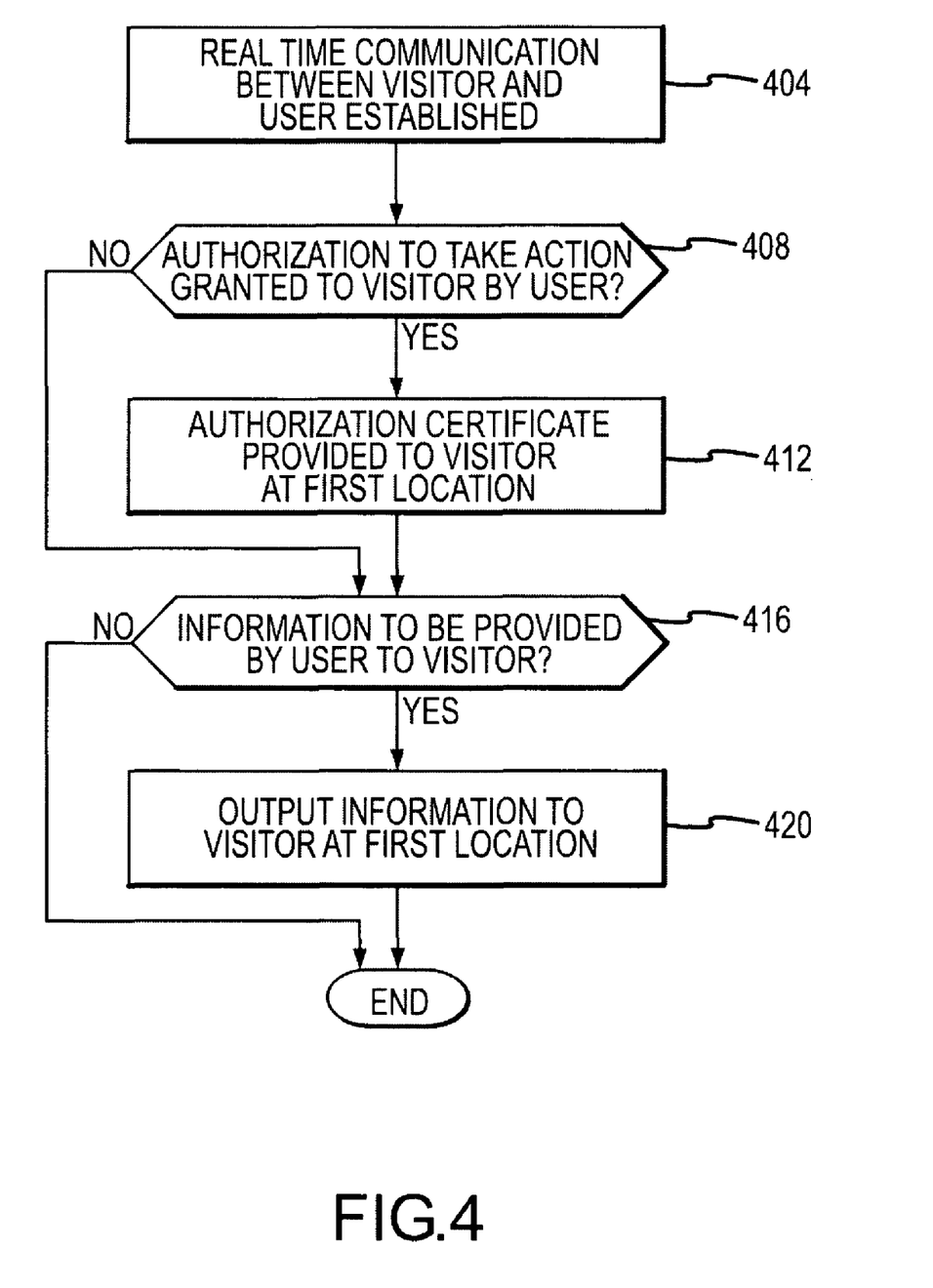
FIG. 4 is a flow chart depicting aspects of the operation of a system for providing a virtual office presence bridge in connection with remotely providing authorization or information.

With reference to FIG. 4, a process for providing authorization and/or output to a visitor to a first physical location 104 in accordance with the embodiments of the present invention is illustrated. Initially, in step 404, real-time communication between a visitor at the first physical location 104 and the user at the virtual office location 108 is established. Such communication may be established using a process such as the one described in FIG. 3. Accordingly, the user may have received an identification of the visitor provided by a physical presence detector 116, in addition to assertions made by the visitor during real-time communications. Furthermore, during such real-time communications, the visitor may request authorization from the user to take a particular action. For instance, the visitor may be a delivery person seeking authorization to leave a package at the first physical location 104. At step 408, a determination is made as to whether authorization to take such an action is granted to the visitor by the user.

If authorization is granted, an authorization certificate is provided to the visitor at the first physical location 104 (step 412). The authorization certificate may be in the form of a "signature certificate" that is printed at the first physical location 104 that the visitor could accept as the requested authorization. Alternatively or in addition, a digital signature or certificate could be provided to the visitor. For instance, a digital signature or certificate could be uploaded to a memory device associated with a communication device 128 or other device having memory that is associated with the visitor. The delivery of the digital signature certificate may be accomplished by directing the visitor to plug a memory device into a port provided at the first physical location 104, and/or delivering the requested digital signature or certificate via a communication network 112.

After delivering an authorization certificate, or after determining that authorization to take an action has not been granted by the user, for example, because the user does not wish such action to be taken or because no authorization to take an act has been requested, a determination has been made as to whether information is to be provided by the user to the visitor (step 416). For example, the visitor could request a file or other digital data during real-time communications with the user. If the user consents, the requested information can be output to the visitor at the first physical location (step 420). For example, the visitor could plug a USB flash device into a communication device 120 at the first physical location 104 to download the requested information. After completing the download of information, or after determining that that information is not to be provided by the user to the visitor, the process may end.

Although embodiments of the present invention are directed to connecting a visitor to a first physical location 104 in communication with a person associated with that first physical location 104 that is working from a virtual office 108, embodiments of the present invention are not so limited. For example, a first physical location 104 need not be an office or cubicle associated with the particular user. Instead, the first physical location 104 may comprise a business address or an area within a business that can be staffed virtually by a remote user. In such a case, a visitor to a first physical location 104 may be placed in communication with a user at that user's normal office space instead of at a virtual office. In accordance with still other embodiments of the present invention, a virtual office 108 may change according to a user's schedule. For instance, a user may enable features of the notification process during certain days of the week and/or hours of each day. Furthermore, the contact information associated with a virtual office 108 may change according to a user's schedule.

Examples of an application or a process for establishing communications to bridge the gap between a physical location 104 and a virtual location 108 comprising an actual location of a user as described herein includes a hospital environment. For instance, a nurse trying to find a doctor in order to get an answer to a medical question posed by a patient may result in the nurse going to the doctor's office. Upon discovering that the doctor is making rounds, instead of having to page the doctor or use some other delayed method of contact, the nurse's proximity to the doctor's office is detected by a physical presence detector 116 that detects an RFID tag in the nurse's identification badge. The system then operates to determine that the doctor has her cell phone on and is registered as available. Both the doctor's cell phone and the phone in the doctor's office ring. When the office phone rings, a voiced in alert informs the nurse that the doctor is available, and the nurse may pick-up that desk phone in order to get an answer to the patent's question. In situations where the user is not available by cell phone, for example because the user is a doctor in an area of a hospital that prohibits the use of cell phones, the system may locate the doctor using a RFID tag carried by the doctor, and cause the closest installed telephone to ring with a voiced in alert notifying the doctor that a visitor is attempting to communicate with the doctor.

The foregoing discussion of the invention has been presented for purposes of illustration and description. Further the description is not intended to limit the invention to the form disclosed herein. Consequently, variations and modifications commensurate with the above teachings, within the skill or knowledge of the relevant art are within the scope of the present invention. The embodiments described hereinabove are further intended to explain the best mode presently known of practicing the invention and to enable others skilled in the art to utilize the invention in such or other embodiments and with various modifications required by their particular application or use of the invention. It is intended that the appended claims be construed to include alternative embodiments to the extent permitted by the prior art.

What is claimed is:

1. A method for facilitating virtual presence, comprising:
at a first physical location associated with a first person, a physical presence detector detecting a physical presence of a second person at the first physical location, wherein the first person is at a virtual office at the time the physical presence of the second person at the first physical location is detected, wherein detecting the presence of a second person at the first physical location includes detecting a radio frequency identification (RFID) tag associated with the second person at the first physical location;
in response to detecting the physical presence of the second person at the first physical location, a processor determining an identity of the second person;
the processor determining a first communication device associated with at least one of the virtual office or the first person, wherein determining the first communication device includes determining an address of at least one communication device at the virtual office;
the processor sending a notification to the first communication device to notify the first person at the virtual office of the presence and the identity of the second person at the first physical location, wherein the presence and the identity are provided in a common notification message;
the processor receiving an input from the first communication device that the first person authorizes initiation of a communication channel between the first communication device and a second communication device at the first location; and
in response to receiving the input, the processor initiating the communication channel between the first communication device and the second communication device.

2. The method of claim 1, wherein the first physical location is a physical office of the first person.

3. The method of claim 1, wherein notifying the first person at the virtual office of the presence of the second person at the first physical location includes providing a message to the first person using at least one of a computer, a telephone, a personal digital assistant and a pager.

4. The method of claim 1, wherein initiating a communication channel between the first person at the virtual office and the second person at the first physical location comprises initiating a communication channel between a communication device at the virtual office and at least one of a communication device associated with the first physical location and a communication device associated with the second person.

5. The method of claim 1, wherein initiating a communication channel between the first person at the virtual office and the second person at the first location comprises initiating a telephone call.

6. The method of claim 5, wherein the telephone call is made to a communication device associated with the first physical location.

7. The method of claim 5, wherein the telephone call is announced to the second person using a voice notification indicating that the first person is available to speak with the second person.

8. The method of claim 6, wherein the communication device associated with the first location comprises a desk telephone at the first physical location.

9. The method of claim 1, further comprising:
the second person engaging in a communication with the first person using the communication channel.

10. The method of claim 9, further comprising:
the second person requesting authorization from the first person;

in response to the first person granting the requested authorization, providing the second person at the first physical location evidence of the authorization.

11. A system for providing virtual presence, comprising:
a proximity detector at a first location associated with a first person, the proximity detector operable to detect the presence of a second person at the first location while the first person is at a second location and operable to send a signal associated with the detection of the second person;
a virtual presence database operable to store virtual office presence status for the first person and operable to store an address for a first communication device associated with the first person at the second location;
an identification database operable to determine the identity of the second person detected by the proximity detector;
a notification algorithm in communication with the proximity detector, the virtual presence database, and the identification database, the notification algorithm operable to:
receive the signal from the proximity detector,
in response to the signal, obtain the virtual office presence status for the first person from the virtual presence database,
if the first person has enabled a virtual office presence feature, retrieve the address for the first communication device from the virtual presence database, and
send a notification signal to the first person at the address of the first communication device to notify the first person of the presence of the second person at the first location; and
a second communication device at the first location, wherein the second communication device at the first location is operable to place the second person in communication with the first communication device of the first person while the second person is at the first location and after the notification algorithm has initiated the notification signal to the first person, wherein the first communication device is a mobile device associated with the first person.

12. The system of claim 11, further comprising:
a third communication device at the second location,
wherein the notification algorithm determines that the first person is at the second location,
wherein the signal notifying the first person of the presence of the second person at the first location is delivered to the first person through the mobile device at the second location, and
wherein a communication channel is established between the third communication device at the second location and the mobile device at the second location.

13. The system of claim 11, wherein the second person carries a radio frequency identification (RFID) tag, and wherein the proximity detector comprises an RFID reader.

14. The system of claim 11, wherein the proximity detector identifies the second person, and wherein the identity of the second person is included in the notification signal to the first person.

15. The system of claim 11, further comprising:
an output device at the first location, wherein an authorization from the first person can be delivered to the second person at the first location.

16. A system for providing virtual presence, comprising:
a memory operable to store computer-executable instructions;
a processor in communication with the memory, the processor operable to execute the computer-executable instructions, wherein the computer-executable instructions comprise:
instructions to receive a presence signal from a proximity detector;
instructions to detect a physical presence of a second person at a physical office location while a first person is at a second location from the presence signal, wherein the physical office location is associated with the first person;
instructions to access an identification database;
instructions to determine automatically, from the identification database, the identity of the second person;
instructions to access a virtual presence database, wherein the virtual presence database stores virtual office presence status for the first person;
instructions to determine, from the virtual presence database, that the first person has enabled a virtual presence feature, wherein enablement of the virtual presence feature indicates that the first person is at a virtual office;
instructions to determine, from the virtual presence database, current contact information for the first person at the virtual office, wherein the virtual office is at a different location from the physical office location, wherein the current contact information for the first person is an address for a mobile device associated with the first person at the virtual office;
in response to detecting the physical presence of the second person at the physical office location, instructions to send a signal to notify the first person, at the virtual office, of the presence and the identity of the second person at the physical office location;
instructions to receive an authorization from the first person to communicate with the second person;
instructions to establish communication between the mobile device associated with the first person and a communication device located at the physical office location and in proximity to the second person while the second person is at the physical office location and while the first person is at the virtual office, wherein the mobile device at the virtual office places the first person in communication with the communication device in proximity to the second person while the second person is at the physical office location.

17. The system of claim 16, wherein the instructions for establishing communication between the first person and the second person while the second person is at the physical office location includes instructions for providing a voice announcement to the second person that the first person is available for voice communications.

18. The system of claim 16, further comprising:
instructions for providing authorization from the first person to the second person at the physical office location.

19. The method of claim 1, further comprising:
in response to detecting the physical presence of the second person at the first location, the processor determining if the first person has enabled a virtual presence feature;
only if the first person has enabled the virtual presence feature, sending the notification.

* * * * *